(12) United States Patent
Ragland et al.

(10) Patent No.: US 6,437,702 B1
(45) Date of Patent: Aug. 20, 2002

(54) CARGO SENSING SYSTEM AND METHOD

(75) Inventors: Richard Ragland; David Stillinger, both of Cardiff; Charles Pedersen, San Diego, all of CA (US)

(73) Assignee: Qualcomm, Inc., San Diego, CA (US)

( * ) Notice: Subject to any disclaimer, the term of this patent is extended or adjusted under 35 U.S.C. 154(b) by 0 days.

(21) Appl. No.: 09/549,818

(22) Filed: Apr. 14, 2000

(51) Int. Cl.$^7$ .............................................. G08B 21/00
(52) U.S. Cl. .............................. 340/686.1; 340/425.5; 340/686.6; 367/93
(58) Field of Search ..................... 340/686.1, 686.6, 340/425.5, 566, 903, 943; 367/93, 94; 180/167, 169, 290

(56) References Cited

U.S. PATENT DOCUMENTS

| | | | |
|---|---|---|---|
| 3,431,550 A | * 3/1969 | Spence | 367/93 |
| 3,681,750 A | * 8/1972 | Larka | 367/135 |
| 4,750,197 A | 6/1988 | Denekamp et al. | |
| 5,015,145 A | * 5/1991 | Angell et al. | 414/547 |
| 5,532,521 A | * 7/1996 | Leininger | 307/10.2 |
| 5,598,141 A | * 1/1997 | Grasmann et al. | 340/426 |
| 5,917,433 A | 6/1999 | Keillor et al. | |
| 5,917,776 A | * 6/1999 | Foreman | 367/93 |
| 5,920,521 A | * 7/1999 | Kromer et al. | 367/93 |

FOREIGN PATENT DOCUMENTS

| | | |
|---|---|---|
| DE | 3003887 | 8/1981 |
| FR | 2582429 | 11/1986 |
| WO | 9933040 | 7/1999 |

\* cited by examiner

*Primary Examiner*—John Tweel
(74) *Attorney, Agent, or Firm*—Philip R. Wadsworth; Gregory D. Ogrod; Thomas M. Thibault (57) ABSTRACT

A method and apparatus for determining whether cargo is present in a freight car. The freight car has a proximal ("rear") end with a loading door and opposing, distal ("front") end. One or more transmitters and receivers are mounted inside the freight car at the front end, toward the car's ceiling. The transmitters/receivers are operated by a controller, which also functions to analyze data from the transmitters/receivers and transmit related reports to a remote monitoring site. During a prescribed time period, a transmitter generates an ultrasonic signal pattern with a coverage area of prescribed radius that terminates before reaching the loading door. During the time period of transmission, or slightly later to account for signal reflection time, the controller operates the receiver to detect reflected signals originating from the transmitter. Then, the controller transmits a report of whether cargo is present in the freight car, based on whether any reflected signals were received.

17 Claims, 6 Drawing Sheets

(PRIOR ART)

CARGO SENSING SYSTEM AND METHOD

BACKGROUND OF THE INVENTION

I. Field of the Invention

The present invention relates to object-sensing systems, and more particularly, an on-site system that transmits ultrasonic signals and then detects reflected signals to determine whether cargo is present in a freight trailer. This system may also send a representative report to a remote location.

II. Description of the Related Art

A number of carriers and logistics-based businesses are utilizing the OmniTRACS® system, which is a mobile information management system provided by QUALCOMM, Inc. The OmniTRACS system is an interactive information management system that includes two-way mobile communications, satellite tracking, and fleet management software. OmniTRACS system includes integrated mobile hardware, network management services, and application software. The OmniTRACS system manages data flow in areas related to communications and tracking, maintenance and performance monitoring, mileage reporting, driver e-mail, and the like.

One further development of the OmniTRACS system has been the TrailerTRACS® product. The TrailerTRACS product monitors various raw statistics concerning the state of freight vehicles, such as semi-tractor trailers. For instance, the TraiterTRACS product can monitor trailer identification, geographical location, load status, refrigerator operation, fuel usage, engine properties, brake behavior, transmission activity, safety-related statistics, and other parameters. The TrailerTRACS product also provides various analytical information, such as notifications or alarms that occur when a trailer is lost, there are too many or too few trailers at one location, there is an unauthorized trailer drop, the wrong trailer is connected to a truck, an unscheduled movement occurs, etc.

Although products such as OmniTRACS and Trailer-TRACS have introduced significant benefits to their customers, the present inventors seek to expand and improve capabilities of products such as these. In this respect, one area of recent focus has en sensing the presence or absence of cargo in a semi-trailer or similar freight car.

Although some recent attempts have been made utilizing ultrasonic transmitters and receivers to sense cargo, they have encountered some technical challenges. Sensing accuracy is influenced by various factors, such as humidity, temperature, beam orientation, and the like. Also, false cargo sensing can result from the nearby presence of small objects (which can appear as large objects or even a full load), the presence of ceiling ribs or other structural members of the freight car, etc.

Sensing anomalies and other errors like these can result in inaccurate output signals, defeating the entire purpose of performing cargo sensing in the first place.

Consequently, existing ultrasonic cargo sensing systems are not completely adequate for some applications due to certain unsolved problems.

SUMMARY OF THE INVENTION

Broadly, the present invention concerns a system for sensing and reporting the presence or absence of cargo in a semi-trailer or similar freight car. The freight car has a proximal ("rear") end with a loading door and also has an opposing, distal ("front") end. Initially, one or more transmitters and receivers are mounted inside the freight car at the front end. Because cargo is typically loaded against the front wall, the transmitters/receivers are mounted toward the ceiling to minimize the possibility of damage caused by loading and unloading cargo. The transmitters/receivers are operated by a controller, which also functions to analyze data from the receivers and transmit related reports to a remote monitoring site. In one embodiment, the transceiver is operated to detect objects in the front third of the freight car, and if any such objects are detected, the controller reports the freight car as being "full".

More particularly, the controller operates the transmitters/receivers as follows. During a prescribed time period, the controller directs the transmitter to generate a sonic signal pattern. As an example, the signal pattern may effectively reach and reflect from objects in the first third (approximately) of the car's length. The signal pattern may be intentionally shaped to avoid detecting low-lying boxes, pallets, blankets, dollies, ladders, and the like near the front of the car. During the time period of transmission, or slightly later to account for signal reflection time, the controller operates the receiver to detect reflected signals originating from the transmitter.

After this period, the controller transmits a report of whether any cargo is present in the freight car. This is achieved by transmitting a representative output signal, which indicates "full load" if any reflected signals are detected during the time period. Otherwise, if no reflected signals are detected during the time period, the controller reports that the freight car is empty.

The foregoing features may be implemented in a number of different forms. For example, the invention may be implemented to provide a method to determine whether cargo is present in a freight car, as shown by various techniques explained herein. In another embodiment, the invention may be implemented to provide an apparatus such as an on-site cargo sensing and reporting device. In still another embodiment, the invention may be implemented to provide a signal-bearing medium tangibly embodying a program of machinereadable instructions executable by a digital data processing apparatus to determine whether cargo is present in a freight car. Another embodiment concerns logic circuitry having multiple interconnected electrically conductive elements configured to determine the presence of cargo freight as shown herein.

The invention affords its users with a number of advantages. Beneficially, the invention utilizes carefully patterned sonic beams to probe for cargo in a freight car, analyze the received signal reflections (if any), and transmit a representative report to a remote site such as a monitoring base station. Fleet managers benefit from having such information, because they can remotely monitor cargo status of their freight cars. The transmitted beam pattern gives the invention a particular advantage by reducing unwanted signal feedback from structure of the freight car itself, and from ever-present low-lying objects in the car's front end. The invention also provides a number of other advantages and benefits, which should be apparent from the following description of the invention.

DETAILED DESCRIPTION OF THE PREFERRED EMBODIMENTS

I. Introduction

The nature, objectives, and advantages of the invention will become more apparent to those skilled in the art after considering the following detailed description in connection with the accompanying drawings.

II. Hardware Components & Interconnections

Overall System

Figure 1:
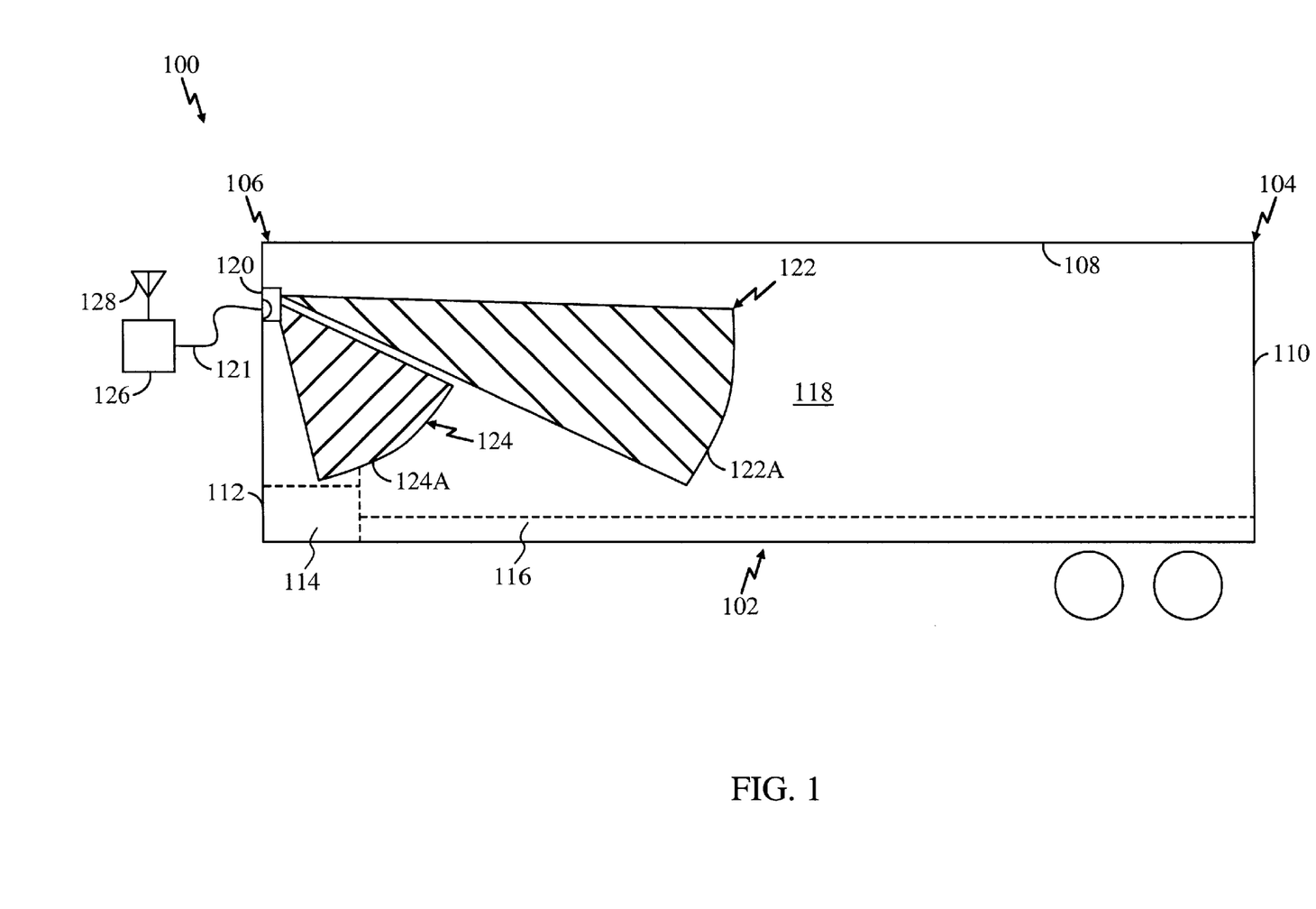
FIG. 1 is a block diagram of a cargo sensing and reporting system, according to the invention.

One aspect of the invention concerns a cargo sensing and reporting system, which may be embodied by various hardware components and interconnections, with one example being described by the system 100 of FIG. 1. The system 100 includes an ultrasonic transceiver assembly 120, controller 126, and antenna 128.

The transceiver assembly 120 includes one or more transmitter components and one or more receiver components, as discussed below. The transceiver assembly 120 is mounted inside a freight car 102, which in the illustrated example comprises a tractor trailer. The car 102 includes a distal end 106 ("front") and an opposing, proximal end 104 ("rear"). A cargo door 110 provides access to a large, internal storage compartment 118. As illustrated, the transceiver assembly 120 is mounted to a distal wall 112, near the car's ceiling 108. This mounting protects the transceiver assembly 120 from collateral damage when loading and unloading the trailer.

Although the freight car 102 is discussed by way of example, the invention is also useful in other contexts, such as railcars, ships, aircraft storage areas, etc. The transceiver assembly 120 is coupled to the controller 126 by a link 121, comprising one or more wires, cables, busses, fiber optic lines, backplanes, wireless connections, or other suitable links. The controller 126 is located at a convenient and effective site. As an example, the controller 126 may be collocated with the transceiver assembly in the car 104, or positioned in a truck cab (not shown). Broadly, the controller 126 functions to selectively activate the transmitter and receiver, receive and analyze return signals from the receiver, and prepare and transmit reports to remote monitoring sites.

As one example, the controller 126 may comprise a digital data processing apparatus, embodied by various hardware components and interconnections such as a microprocessor-based computer. In this respect, an additional aspect of the invention concerns a signalbearing medium containing machine-readable instructions executable by the digital processing apparatus used to implement the controller 126. Such a signal-bearing media comprises storage (not shown) contained within the controller, or nonetheless accessible to the controller while being externally located. Some examples of signal-bearing media include random access memory, direct access storage (e.g., conventional "hard drive," redundant array of inexpensive disks ("RAID"), diskettes, etc.), magnetic tape, electronic read-only memory (e.g., ROM, EPROM, or EEPROM), optical storage (e.g., CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise software object code, compiled from a language such as "C," etc.

Alternatively, the controller 126 may use logic circuitry instead of executing machine-readable instructions with a computer. Depending upon the particular requirements of the application in the areas of speed, expense, tooling costs, and the like, this logic may be implemented by constructing an application-specific integrated circuit ("ASIC") having thousands of tiny integrated transistors. Such an ASIC may be implemented with CMOS, TTL, VLSI, or another suitable construction. Other alternatives include a digital signal processing chip ("DSP"), discrete circuitry (such as resistors, capacitors, diodes, inductors, and transistors), field programmable gate array ("FPGA"), programmable logic array ("PLA"), and the like.

The controller's antenna 128 comprises a satellite antenna or other suitable device to exchange messages with a remote monitoring site, such as a base station or central control facility. In this regard, one function of the system 100 is to report the status of cargo in the freight car 102 to a remote monitoring site, as explained in greater detail below. In addition to satellite antennas, other examples of suitable antennas include RF antennas, cellular telephone antennas, etc.

Transceiver Assembly and Installation

Figure 2:
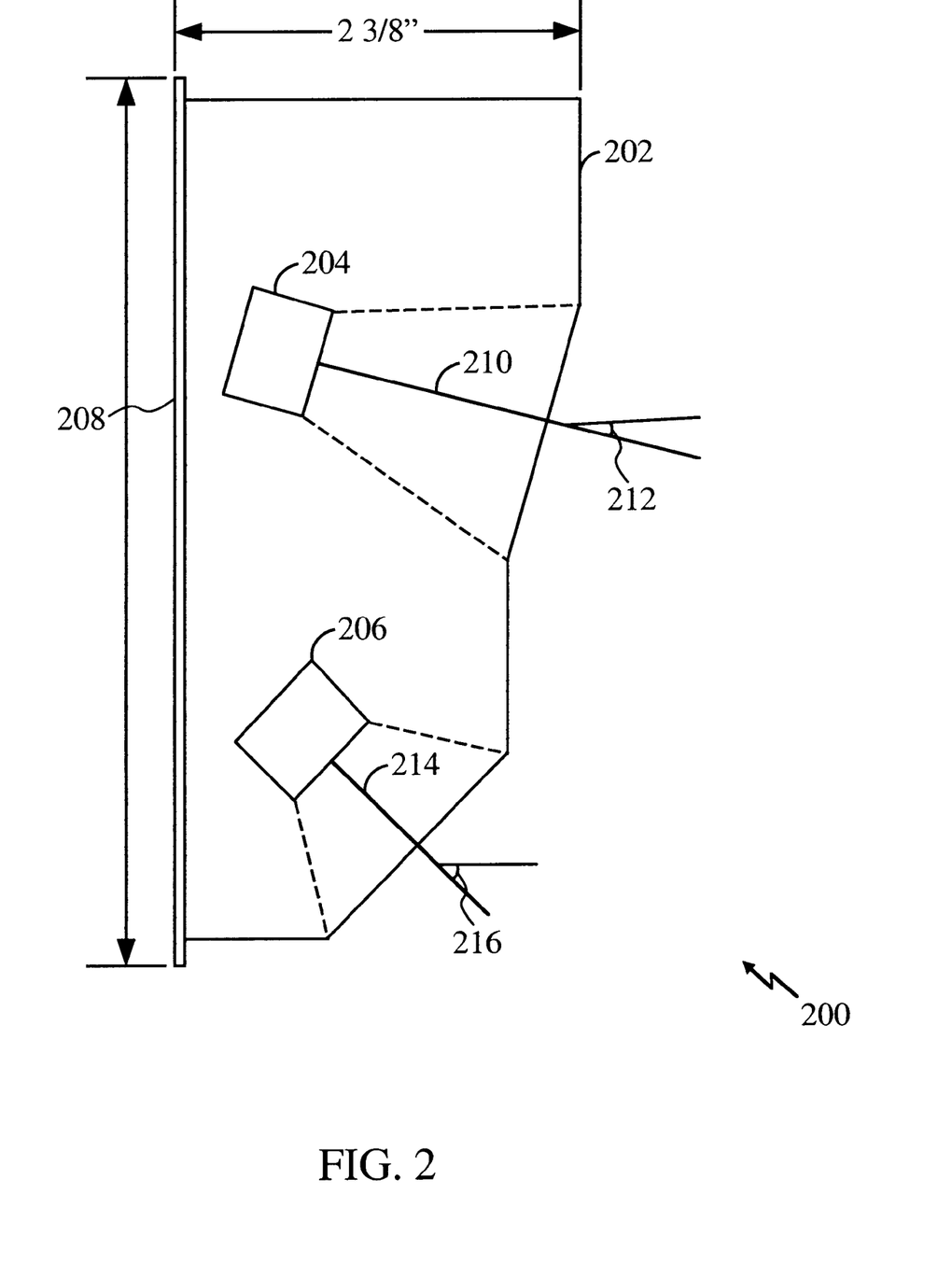
FIG. 2 is a side view diagram of an ultrasonic transceiver assembly according to the invention.

FIG. 2 depicts the hardware components of a transceiver assembly 200, which provides one specific implementation of the transceiver assembly 120. The transceiver assembly 200 includes at least one transmitter and at least one receiver. In the illustrated example, the assembly 200 includes back-facing and down-facing transmitters 204, 206. Receivers (not shown) are also provided, although their precise location may be amenable to several different locations due for the relative ease of receiving signals in comparison to the greater directional precision required to initially transmit the signals. Multiple receivers may be used or just one receiver, depending upon the requirements of the application. A housing 202 contains the transmitters 204, 206 and receiver(s). The housing 202 includes a mounting surface 208 that is mounted to the wall 112.

The transmitters 204, 206 emit ultrasonic signals having patterns designed to cover the areas shown by 122, 124 (respectively). The coverage areas 122, 124 are schematic representations of the actual transmission patterns, a representation of which may be seen in FIG. 6 (discussed below). The actual transmission patterns are designed to optimally cover the targeted areas 122, 124 inside the trailer when the transceiver assembly 120 is mounted high inside the freight car 102, at the distal end 106. The orientation the coverage areas 122, 124 ensures that transmitted energy does not significantly impinge upon low-lying boxes, pallets, blankets, dollies, ladders, other objects that frequently occupy regions 114, 116 of freight cars. High mounting also helps prevent damage to the transceiver assembly that might otherwise occur if cargo slides forward during sharp deceleration of the car 102.

Within the mounting as shown, orientation of the coverage areas 122, 124 is determined by the transmitters' respective "down angles." As shown in FIG. 2, each transmitter 204, 206 has a respective focal line 210, 214. The transmitters 204, 206 are each mounted so that the focal lines define specific down angles 212, 216 with respect to the horizontal.

Of course, these angles may be measured differently while still defining the orientation of the transmitters. In the illustrated example, the back-facing transmitter 204 exhibits a down angle 212 of about thirteen degrees, while the down-facing transceiver 206 exhibits a down angle 216 of about forty-five degrees. The down angle 212 is selected to avoid impinging the coverage area 122 upon the ceiling 108, which might result in the unintended detection of ceiling joists and other structural features unrelated to cargo. The down angle 216 is selected to avoid impinging the coverage area 124 upon the areas 114, 116.

Each coverage area 122, 124 has a respective radius 122a, 124a or "range." Basically, these radii are determined by how long the controller waits to detect reflected signals after transmission. Accordingly, the radii are adjustable, and in the present illustration they. are adjusted so that the coverage area 122 does not read the loading door 110, and the coverage area 124 stops a predetermined distance from the floor sufficient to avoid impinging on low lying cargo in regions 114, 116. As one specific example, the radius 124a may be about eight feet, with the radius 122a being about twenty feet.

The transmitters' frequencies and power output also help dictate the coverage areas 122, 124. To provide a coverage area (112) of longer range in the upper regions of the car 102, the upper transmitter may broadcast at a lower frequency such as 25 KHz. As an example, this transmitter may be driven with a 50% duty cycle square wave of about six volts peak-to-peak. Conversely, to provide a coverage area (124) of relatively shorter range in the lower regions of the car 102, the lower transmitter may broadcast at higher frequency such as 40 KHz. As an example, this transmitter may be driven with a 50% duty cycle square wave of about sixteen volts.

Figure 3:
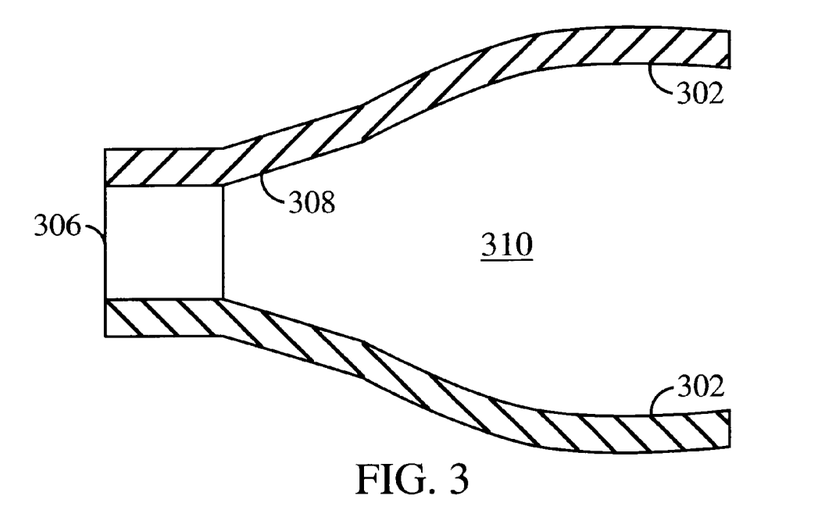
FIG. 3 is a cross-sectional side view of an illustrative ultrasonic transmitter according to the invention.
Figure 4:
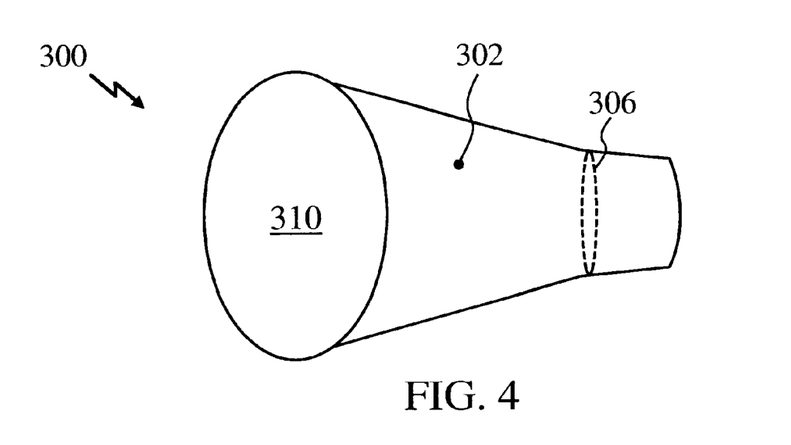
FIG. 4 is a perspective view of the ultrasonic transmitter of FIG. 3.

As explained below, the structure comprised of the transmitters 204, 206 and waveguide cones as shown in FIG. 3 and FIG. 4 help to shape and direct signal patterns to create the respective coverage areas 122, 124 a longer central lobe and shorter side lobe, providing several advantages also discussed below.

Transceiver

FIGS. 3–4 depict an exemplary transmitter 300. The transmitter 300 includes a cone 302 and a sound-producing element 306 such as a Nippon Ceramic brand piezo element. The element 306 may produce signals in the ultrasonic range, for example. The element 306 utilizes a vibrating member (such as a piezoelectric device, not shown) to generate its ultrasonic signal pattern. Advantageously, the housing of the element 306 lies flush against the inner surface 308 of the cone 302, providing a contiguous surface for generating and directing the ultrasonic signals through the interior 310 of the cone 302 and then outward. In the illustrated example, the cone 302 has a parabolic shape. As discovered by the present inventors, the foregoing features create a pattern with a greater central lobe and diminished side lobes as discussed below in conjunction with FIG. 6.

Figure 5:
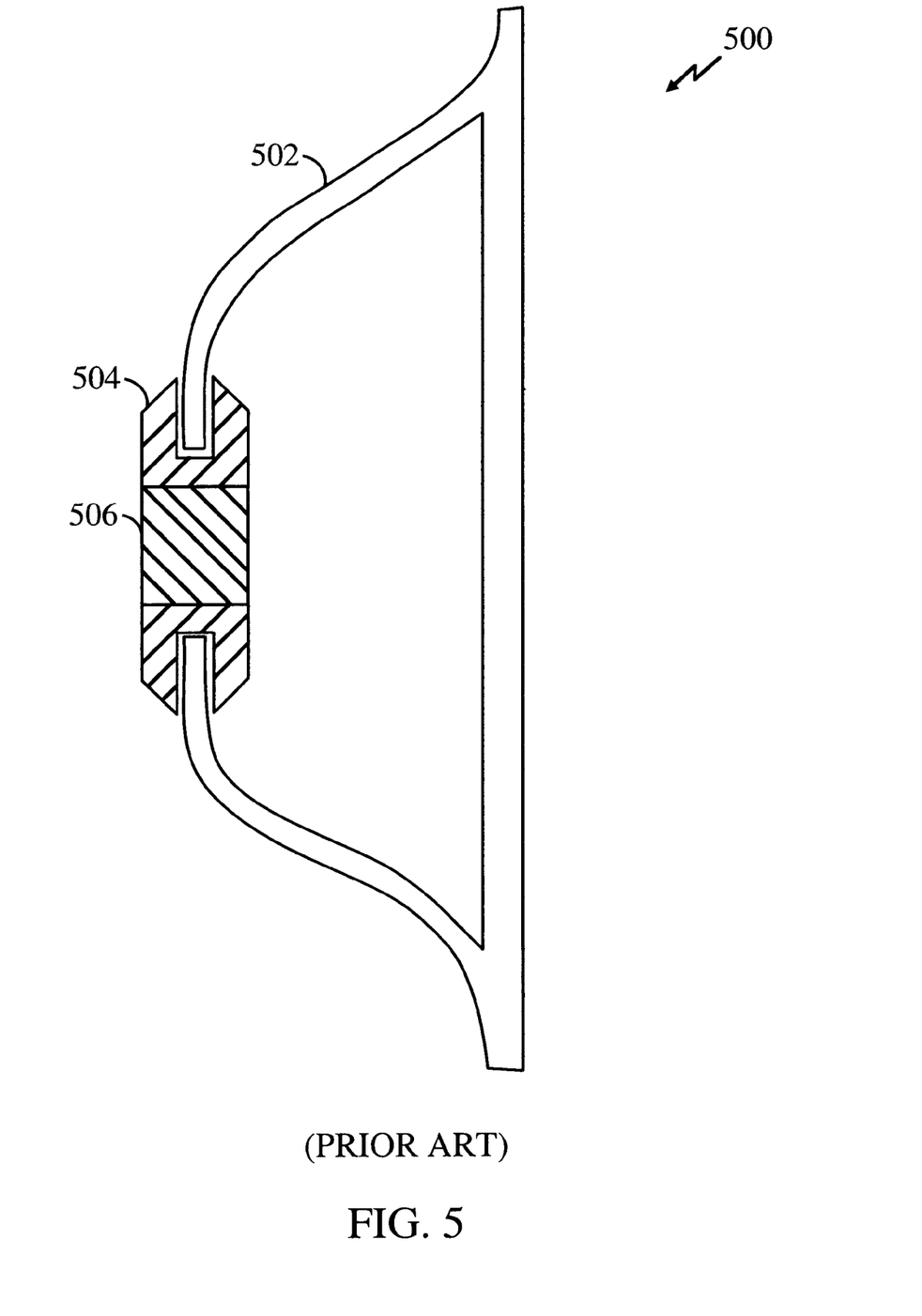
FIG. 5 is a cross-sectional side view of a prior art ultrasonic transceiver.

This contrasts with the conventional product for this application, exemplified by the transmitter 500 (FIG. 5). The transmitter 500 includes a cone 502 with a centrally mounted sonic element 506 held in place with a grommet 504.

Figure 6:
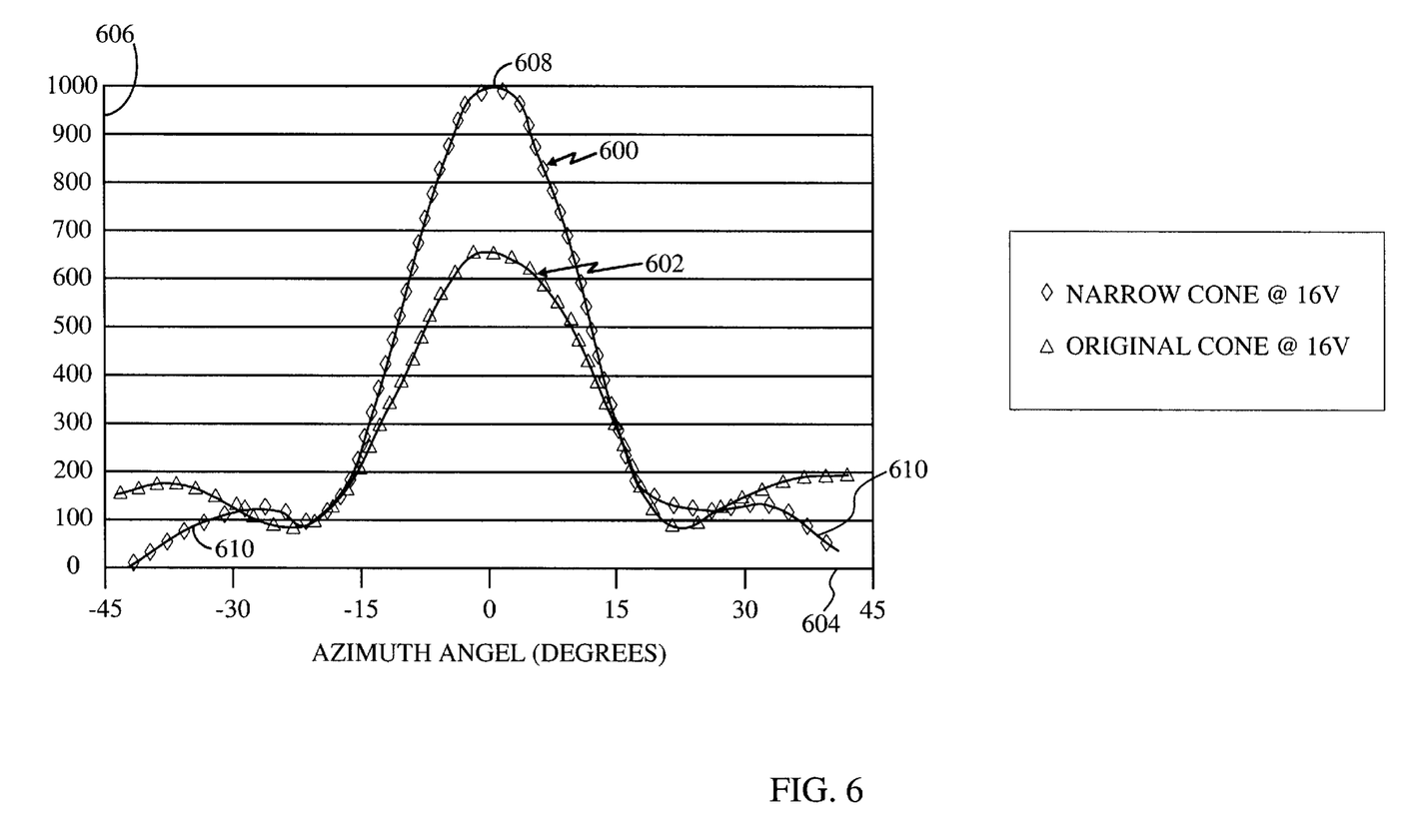
FIG. 6 is a graph comparing signal strength and pattern of the present invention's ultrasonic transmitter to a prior transmitter.

FIG. 6 depicts a comparison between the transceivers 300, 500 operating at twenty-five kilohertz. The signal pattern 600 represents signal strength of the transmitter 300, while the signal pattern 602 represents signal strength of the transmitter 500 when both are measured with the same transmit voltage (peak to peak). The horizontal axis 604 represents azimuth angle in degrees, while the vertical axis 606 represents detected output level in units of millivolts, at a distance of about twenty inches. As discovered by the present inventors, the signal pattern 600 includes side lobes 610 of significantly less energy with respect to the central lobe 608 than in the signal pattern 602.

III. Operation

Figure 7:
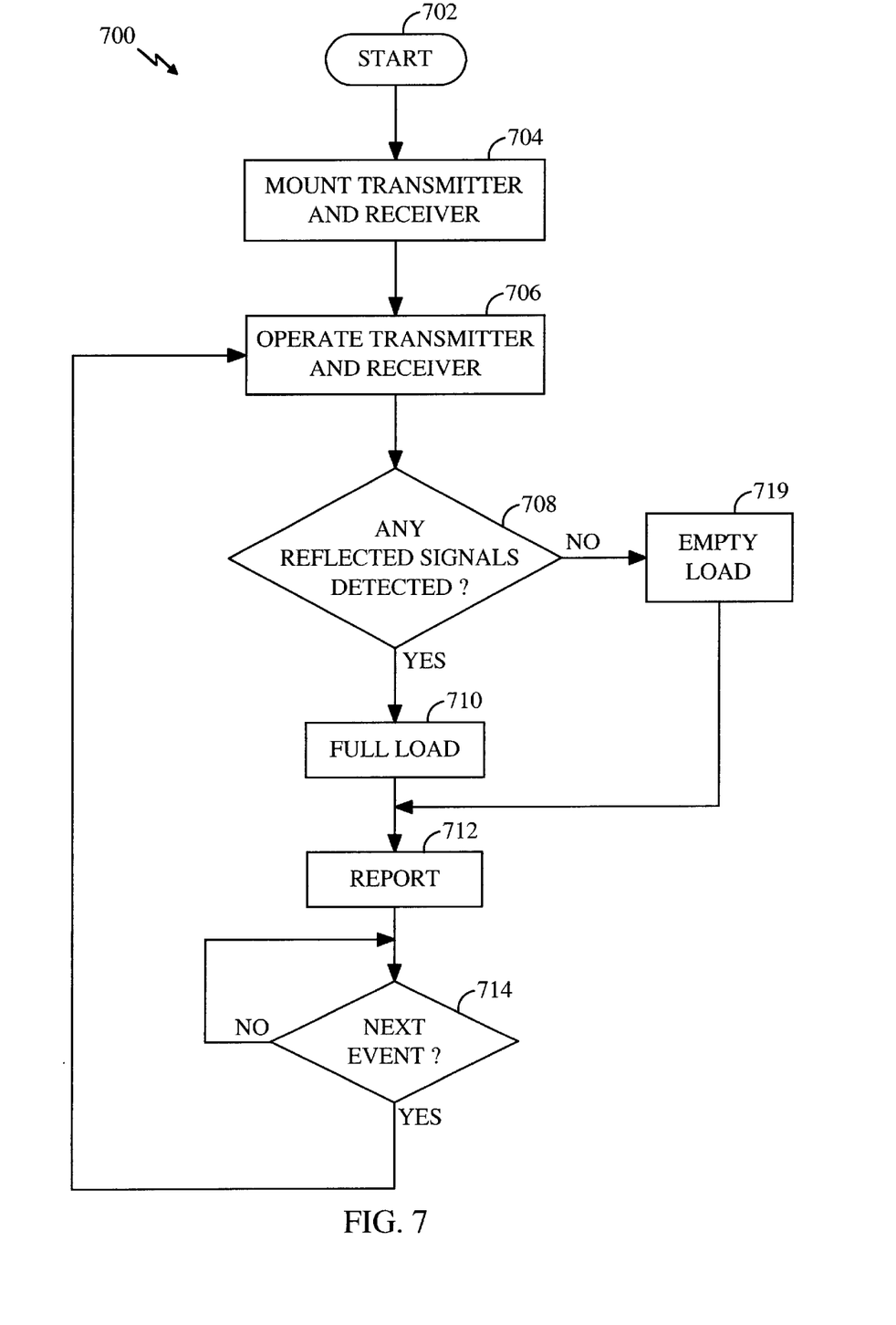
FIG. 7 is a flowchart of an operational sequence for on-site cargo sensing and reporting, according to the invention.

In addition to the various hardware embodiments described above, a different aspect of the invention concerns a method for on-site sensing and reporting of cargo present in a freight car. FIG. 7 shows a sequence 700 to illustrate one example of this method. For ease of explanation, but without any intended limitation, the example of FIG. 7 is described in the context of the hardware of FIGS. 1–4, described above. The sequence 700 is performed by a combination of manual effort as well as automated actions of the controller 126, as shown below.

The sequence 700 begins in step 702. In step 704, technicians mount the transceiver assembly 120 to the wall 112. At this time, or a previous time, technicians also install the controller 126, link 121, and antenna 128. The transceiver assembly 120 is mounted to implement the considerations of location (e.g. height on the wall 112) and orientation (e.g. down angles) discussed above. Also in step 704, technicians activate the system 100.

In step 706, according to a prescribed schedule, the controller 126 directs the transmitters to transmit their respective ultrasonic patterns (yielding coverage areas 122, 124) for a prescribed period, such as five seconds. More particularly, the controller 126 directs the transmitter to generate a series of multiple, brief ultrasonic "pings." As one particular example, each such ping may last for approximately twenty cycles. During this time, or slightly thereafter to account for sound transmission delay, the controller 126 also operates the receiver(s)to detect any reflected ultrasonic signals of the transmitters' respective frequencies.

In step 708, the controller 126 examines output of the receiver(s) to determine whether the receiver(s) detected any reflected ultrasonic signals of the proper frequency. If desired, step 708 may apply a minimum signal strength threshold to filter out noise. More importantly, the controller 126 ignores pings that are received more than a prescribed time after the time of their transmission. This prescribed time corresponds to the length of time that the source ultrasonic signal requires to travel from the transmitter to the outer radius of its respective coverage area and back to the receiver. The prescribed time takes into consideration the radius (e.g. 122a, 124a), and also may consider the expected humidity and temperature of air in the freight car, frequency of transmitted ultrasonic signal etc. Accordingly, the prescribed times for the two transmitters' signals differ to account for the different radii 122a, 124a. If the receiver(s) experienced signal detection of one or both transmitted frequencies, the controller 126 concludes that there is a full load (step 710). Otherwise, if neither receiver found a reflected signal, the controller concludes that there is an empty load (step 719). In either case, the controller 126 then proceeds to report these results by transmitting a representative signal via the antenna 128 (step 712). Instead of "full" and "empty", the controller may report "full" (step 710) and "not-full" (step 719), or in a different embodiment "not empty" (step 710) and "empty" (step 719).

After step 712, step 714 asks whether an applicable criteria for repeating signal transmission/receipt has occurred. As an example, step 706 may be performed periodically, on a non-periodic schedule, according to behavior of the truck or input from the driver, or any other suitable criteria implemented by the controller 126. Whenever this criteria is satisfied, step 714 returns to step 706, and continues as discussed above.

IV. Other Embodiments

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated. Additionally, ordinarily skilled artisans will recognize that operational sequences must be set forth in some specific order for the purpose of explanation and claiming, but the present invention contemplates various changes beyond such specific order.

What we claim as our invention is:

1. A method for reporting whether cargo is present in a freight car having a proximal end with a loading door and also having an opposing, distal end, the method comprising operations of:

mounting at least one ultrasonic transmitter and at least one ultrasonic receiver inside the freight car at the distal end;

operating the transmitter to generate an ultrasonic signal pattern having a coverage area with a prescribed radius that terminates before reaching the loading door;

operating the receiver to detect reflected ultrasonic signals of similar character as the signals generated by the transmitter;

reporting whether cargo is present in the freight car by transmitting a representative output signal, comprising:
  if the receiver detects a reflected signal, reporting that the freight car is full;
  if the receiver does not detect a reflected signal, reporting that the freight car is empty.

2. The method of claim 1, the operation of generating an ultrasonic signal pattern having a coverage area with a prescribed radius that terminates before reaching the loading door comprising:

ignoring reflected ultrasonic signals that arrive more than a prescribed time after their transmission.

3. The method of claim 1, the operation of generating an ultrasonic signal pattern having a coverage area with a prescribed radius that terminates before reaching the loading door comprising:

utilizing a transmit cone of prescribed configuration to shape the coverage area.

4. The method of claim 1, the operations utilizing a transmitter including a sonic cone and a sound-producing element substantially flush with the cone.

5. The method of claim 1, the mounting operation comprising affixing the transmitter to a wall inside the freight car such that the transmitter has a down angle of about thirteen degrees.

6. The method of claim 1, where:
the mounting operation installs first and second transmitters inside the freight car at the distal end;
the operations further comprise:
  operating the second transmitter to generate a second ultrasonic signal pattern having a coverage area with a prescribed radius that terminates before reading a floor of the car; and
  operating the receiver to detect reflected ultrasonic signals of similar character as the signals generated by the second transmitter; and the operation of reporting whether cargo is present in the freight car comprising:
  if the receiver detects a reflected signal from at least one of the transmitters, reporting that the freight car is full;
  if the receiver does not detect a reflected signal, reporting that the freight car is empty.

7. The method of claim 6, the mounting operation affixing the second transmitter to a wall inside the freight car such that the second transmitter has a down angle of about forty five degrees.

8. A signal-bearing medium tangibly embodying a program of machine-readable instructions executable by a digital processing apparatus to perform a method for reporting whether cargo is present in a freight car having a proximal end with a loading door and also having an opposing, distal end, the method comprising operations of:

operating an ultrasonic transmitter mounted at the proximal end to generate an ultrasonic signal pattern having a coverage area with a prescribed radius that terminates before reaching the loading door;

operating an ultrasonic receiver mounted at the proximal end to detect reflected sonic signals of similar character as the signals generated by the transmitter;

reporting whether cargo is present in the freight car by transmitting a representative output signal, comprising:
  if the receiver detects a reflected signal, reporting that the freight car is full;
  if the receiver does not detect a: reflected signal, reporting that the freight car is empty.

9. A logic circuit of multiple interconnected electrically conductive elements configured to perform operations to report whether cargo is present in a freight car having a proximal end with a loading door and also having an opposing, distal end, the method comprising operations of:

operating an ultrasonic transmitter mounted at the proximal end to generate an ultrasonic signal pattern having a coverage area with a prescribed radius that terminates before reading the loading door;

operating an ultrasonic receiver mounted at the proximal end to detect reflected sonic signals of similar character as the signals generated by the transmitter;

reporting whether cargo is present in the freight car by transmitting a representative output signal, comprising:
  if the receiver detects a reflected signal, reporting that the freight car is full;
  if the receiver does not detect a reflected signal, reporting that the freight car is empty.

10. An on-site cargo sensing and reporting apparatus, comprising:

at least one ultrasonic transmitter;
at least one ultrasonic receiver;
an antenna;
a controller coupled to the sonic transmitter, receiver, and antenna, programmed to perform operations to report whether cargo is present in a freight car, the freight car having a proximal end with a loading door and also having an opposing, distal end, the transmitter and receiver mounted thereto, the operations comprising:
  operating the transmitter to generate an ultrasonic signal pattern having a coverage area with a prescribed radius that terminates before reaching the loading door; and
  operating the receiver to detect reflected sonic signals of similar character as the signals generated by the transmitter;

reporting whether cargo is present in the freight car by transmitting a representative output signal, comprising:
if the receiver detects a reflected signal, reporting that the freight car is full;
if the receiver does not detect a reflected signal, reporting that the freight car is empty.

11. The apparatus of claim 10, the controller being programmed such that the operation of generating an ultrasonic signal pattern having a coverage area with a prescribed radius that terminates before reaching the loading door comprises:
ignoring reflected ultrasonic signals that arrive more than a prescribed time after their transmission.

12. The apparatus of claim 10, where the transmitter includes a transmit cone of prescribed configuration to provide a coverage area of a predetermined shape.

13. The apparatus of claim 10, the transmitter including a cone and a sound-producing element substantially flush with the cone.

14. The apparatus of claim 10, the transmitter being mounted inside the distal end of the freight car with a down angle of about thirteen degrees.

15. The apparatus of claim 10, where:
the transmitter includes first and second transmitters;
the controller is further programmed to perform operations comprising:
operating the second transmitter to generate a second ultrasonic signal pattern having a coverage area with a prescribed radius that terminates before reaching a floor of the car; and;
operating the receiver to detect reflected ultrasonic signals of similar character as the signals generated by the second transmitter; and
the controller is programmed such that the operation of reporting whether cargo is present in the freight car comprises:
if the receiver detects a reflected signal from at least one of the transmitters, reporting that the freight car is full;
if the receiver does not detect a reflected signal, reporting that the freight car is empty.

16. The apparatus of claim 15, the second transmitter being mounted inside the distal end of the freight car with a down angle of about forty five degrees.

17. An on-site cargo sensing and reporting apparatus, comprising:
first means for transmitting ultrasonic signals;
second means for receiving ultrasonic signals;
third means for exchanging electromagnetic signals with a remote site;
controller means, coupled to the first, second, and third means, for reporting whether cargo is present in a freight car having a proximal end with a loading door and also having an opposing, distal end with the transmitter and receiver mounted thereto, by:
operating the first means to generate an ultrasonic signal pattern having a coverage area with a prescribed radius that terminates before reading the loading door; and
operating the second means to detect reflected ultrasonic signals of similar character as the signals generated by the first means;
reporting whether cargo is present in the freight car by transmitting a representative output signal via the third means, comprising:
if the second means detects a reflected signal, reporting that the freight car is full;
if the second means does not detect a reflected signal, reporting that the freight car is empty.

* * * * *